United States Patent [19]

Kunde et al.

[11] 4,045,138

[45] Aug. 30, 1977

[54] METHOD FOR APPLYING A LIQUID FILLER TO LENSES IN GLASSES FRAMES

[75] Inventors: Donald M. Kunde; Frank M. Lagrimanta, both of Lakewood, Colo.

[73] Assignee: Prado Verde, Inc., Santa Fe, N. Mex.

[21] Appl. No.: 583,597

[22] Filed: June 4, 1975

[51] Int. Cl.² .............................................. G02C 13/00
[52] U.S. Cl. ..................................... 351/178; 351/154
[58] Field of Search ................ 351/154, 178; 156/328, 156/332; 260/33, 8 UA

[56] References Cited

U.S. PATENT DOCUMENTS 2,221,736  11/1940  Lindblom ........................ 351/178 X
2,443,613  6/1948  Fuller ..................................... 156/332

FOREIGN PATENT DOCUMENTS 893,153  2/1972  Canada ................................. 156/332

OTHER PUBLICATIONS

Am. J. of Optometry & Archives, p. 706, Aug. 1972.

Primary Examiner—Paul A. Sacher
Attorney, Agent, or Firm—Van Valkenburgh and Lowe

[57] ABSTRACT

The invention concerns the application of a filler strip to an eye wire rim of a glasses frame to more securely hold a lens in place. The filler strip is provided as a viscous liquid which is applied to the eye wire rim as a bead extending along a selected reach in the rim. The viscous liquid will quickly harden to a resilient solid forming a seat in the eye wire rim to receive the edge of the lens.

4 Claims, 5 Drawing Figures

METHOD FOR APPLYING A LIQUID FILLER TO LENSES IN GLASSES FRAMES

BACKGROUND OF THE INVENTION

The present application relates to eyeglasses, and more particularly to the fitting and installing of a lens in an eyeglass frame.

Many eyeglass frames are a wire rim type which may be either an all metal rim or a metal-plastic combination where the plastic material supplements the wire rims about the lens, usually as a bridge and brow portion. Other eyeglass frames are entirely made of plastic. In each instance, the rim, either of metal or plastic, which holds the lens is commonly called an eye wire. If the eye wire is of metal, it is necessarily separated at a suitable point, usually near the temple hinge of the frame, so that the eye wire may be opened, and in this manner expanded, to receive the lens. A screw connection, at the separation, can pull the ends of the eye wire together after a lens is fitted in place. If the eye wire is of plastic, it is necessarily stretched, or expanded, as by heat, to receive the lens.

Eyeglasses are manufactured in a number of styles with lenses of various shapes, including circular, oval and somewhat rectangular forms. In each instance, the eyeglass frame and especially the eye wires, must be shaped to match the lens. However, the lenses are ordinarily secured from the factory as circular members and each optician has facilities to grind and shape the edges of the lens to fit in a frame selected by the patient, with the final fitting of the lenses in the frame being done by the optician.

It is essential that a lens fit tightly in an eye wire frame or the lens is apt to fall out of the rim and be lost or broken. To facilitate such a fit, an eye wire rim is formed with an internal, V-shaped channel to receive a V-shaped edge of the lens, so cut when the lens is ground. The fit of a lens in a plastic frame is usually tight where the plastic eye wire of the frame is heated and expanded to receive the lens and thereafter cooled to shrink upon the lens. When fitting a frame with a metal eye wire, the lens is positioned in the rim, the screw takes up the separated ends of the eye wire, normally to provide the desirable tight fit. When the fit is tight, the lens may be used for a long period of time without becoming loose.

The edge of a lens is normally ground according to a template available for the purpose, which will match the style of frame being used, and desirably, a substantially perfect fit will be attained. However, as a practical matter, this desirable, perfect fit does not always occur, and in many instances, the lens will be slightly larger or slightly smaller than the inner periphery of the eye wire. If the lens is larger, it is a simple matter to grind its edges until a fit is obtained. If, on the other hand, the lens is smaller than the inner periphery of a metal eye wire, the fit will be loose, even though the screw is fully taken up. When this occurs, and it does so frequently, it becomes necessary to fill a portion of the eye wire channel to securely hold the lens in place. The same problem can occur in a frame having a plastic eye wire, especially where the plastic is nylon which does not easily expand or shrink.

A common material for filling the metal eye wire channel to facilitate fitting an undersize lens in an eye wire frame consists of thin, plastic strips which may be channel shaped to fit better in the eye wire channel and also to provide a seat for receiving the V-shaped edge of the lens. An optician normally cuts a selected length of this filler strip which, in his judgment, will compensate for the looseness of the lens in the frame. He will then place this strip in position and, if his guess is correct, he can then tighten the tube screw to hold the lens in place. These strips do not solve the problem completely for a number of reasons. In the first place, it is a matter of guessing or cut-and-try to select a proper length of a strip in order to obtain a suitable fit. The problems with these filler strips may not end when the optician uses them to fit a lens in place in a frame. Filler strips are also necessary for a thick lens with a sharp edge such as the type used after cataract operations. A thick lens with a sharp edge cannot be effectively seated within and against a metal rim without the risk of chipping an edge of the lens. Accordingly, a filler strip forming a resilient seat is desirable for such sharp-edged lenses.

Sometimes, over a period of use, perhaps as much as a year or two, vibration or movements imparted to the frame of the glasses will cause such strips to slip out of place and become lost and thereafter, the lens will become loose in the eye wire rim to eventually fall out of the rim. Another difficulty with such strips is due to the fact that such filler strips are unsuited to compensate for small spaces or gaps where the contour of the edge of the glasses is not similar to the contour of the eye wire rim. Thus, for a tight fit, several short lengths of filler strip must be placed on each other to fill the gap. In this situation, there is a good probability that the filler strips will soon slip out of place and be lost.

SUMMARY OF THE INVENTION

The present invention was conceived and developed with the foregoing and other considerations in view, and the invention comprises, in essence, a method and product to facilitate the fitting of a lens in the eye wire of a glasses frame, which method includes flowing a bead of a selected viscous resin into the channel of an eye wire. The resin may be either a finished material which can be cut back to a viscous liquid by a volatile solvent, or conceivably, may be an unpolymerized type which will set to a solid material after a short time interval. In either instance, the material forms a yieldable cushion to receive the edge of a lens placed in the eye wire. It is apparent that the size and extent of a bead may be easily varied, depending upon the looseness of the lens in the eye wire. However, the need for precision in the amount of resin to be used is of little importance, because any excess of resin will be squeezed out of the eye wire channel as the eye wire is pulled into a tight position by the tube screw, and it may be thereupon removed. After the lens is in place and as the eye wire is tightened into position, it becomes important that this resin has set up into a solid but resilient, rubbery material to thereafter hold the lens in place with a very tight fit.

The type of resin to be selected for this purpose can be best specified by the necessary physical properties which it must possess in order to perform properly. First, when packaged and prior to use, it must be available as a viscous liquid, with the viscosity being such that it can form a bead or bead-like strip in the eye wire channel and set as a yieldable solid, then remain in position while the glasses frame is receiving the lens.

Second, the resin must be of a type which will adhere to the metal eye wire rim with a moderate degree of tackiness, but not so strongly that it cannot be subsequently removed if such becomes necessary.

Third, the liquid resin, in the quantities used, should not adhere, dissolve or react with the several types of plastic materials used in manufacturing plastic or metal-plastic combination types of frames.

Fourth, the viscous liquid must set to a solid but resilient state within a short period of time after it is applied to the eye wire of the glasses frame, the resiliency being sufficient to permit a lens to be fitted therein, but to hold the lens tightly after the screw is tightened.

Fifth, the material, in setting up, may shrink to provide a trough in which the lens is received but should not shrink excessively.

Sixth, the material, once set up to hold a lens in place, should remain resilient to perform its function of holding the lens for a substantial period of time.

Seventh, the resin, once it is solidified to hold a lens in place, should not melt or deteriorate with heat, such as that encountered when a plastic or metal-plastic combination type of frame is heated, as by immersion in a salt bed, as at a temperature approximating 300° F., to permit the glasses frame to be expanded so that a lens can be subsequently held by shrinkage of the frame, as by immersion in cold water.

Eighth, the resin, once it is solidified to hold a lens in place, should be clear and colorless.

The only resin found to meet the above eight-point specification was cellulose acetate butyrate, as hereinafter described.

It was determined, upon experimentation, that several types of resins did not appear to be useful. A two-component, polyurethane type of resin was prepared by mixing portions of the two components to permit the same to form a viscous liquid having suitable properties of tackiness and resilience and which would not react with certain plastic materials used in eyeglasses. However, the blend of the two components was found to require 2 to 3 hours for the setup time. In other cases, if the ingredients were blended in a manner which would set up in a short period of time, such as 2 to 3 minutes, the product was quite unstable. A cellulose acetate was tested, since it could be liquified by a volatile solvent of a type which would permit it to remain liquid for 2 to 3 minutes. However, after setting, it became too brittle, i.e., having insufficient resilience.

BRIEF DESCRIPTION OF THE DRAWING

With the foregoing in view, our invention comprises certain steps and sequences, ingredients and materials and combinations thereof, all as more fully hereinafter described, defined in the appended claims, and illustrated in the preferred embodiment in the accompanying drawings, in which:

DESCRIPTION OF THE PREFERRED EMBODIMENT

Figure 1:
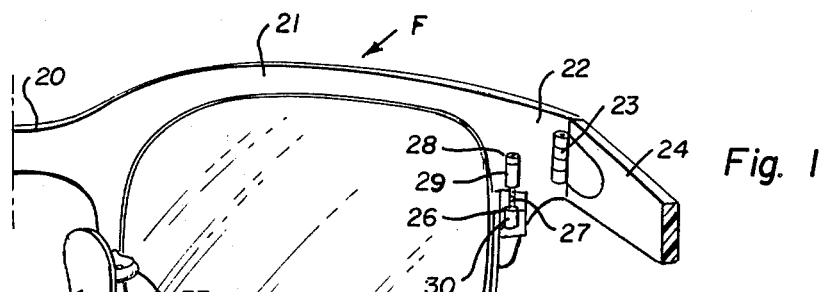
FIG. 1 is a rear elevational view of the right hand half of a lens frame, with a portion of the right hand temple bar extending therefrom and with the screw for the rim wire loosened to open the eye wire at its separation point.
Figure 2:
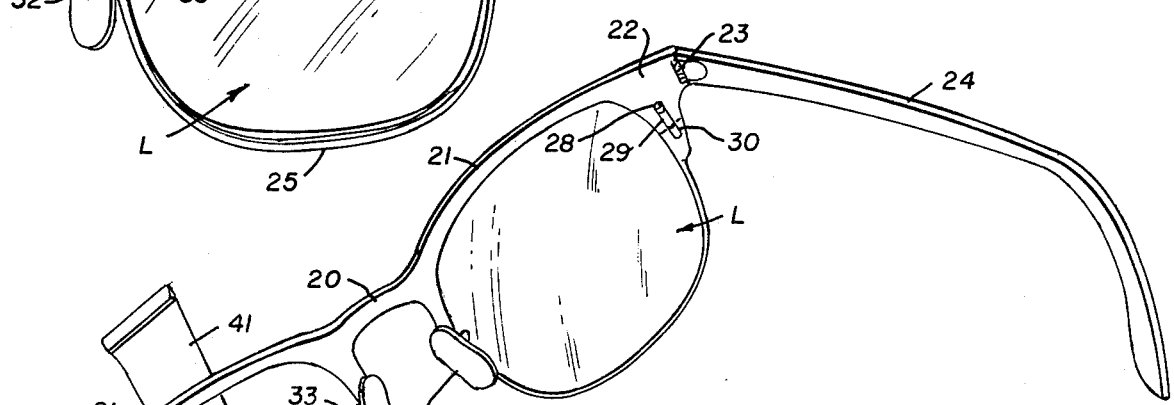
FIG. 2 is a perspective view of a glasses frame with the right hand lens in place, but the left hand lens still to be placed, showing a liquid being applied to the channel of the left hand eye wire according to the principles of the invention.
Figure 3:
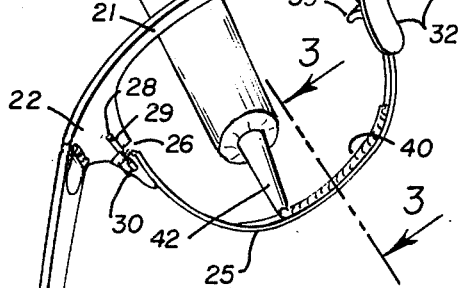
FIG. 3 is a fragmentary, sectional detail, taken on line 3—3 of FIG. 2, but on a greatly enlarged scale, to better exemplify the manner in which a bead of a viscous liquid may be applied to the eye wire forming the rim of the glasses frame.
Figure 3:
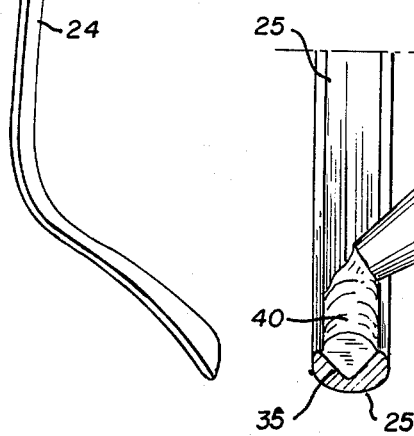
Figure 4:
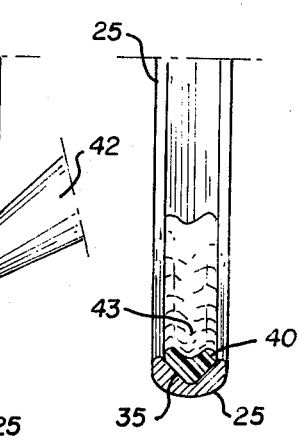
FIG. 4 is similar to FIG. 3, but shows the material applied to the eye wire channel after solidification.
Figure 5:
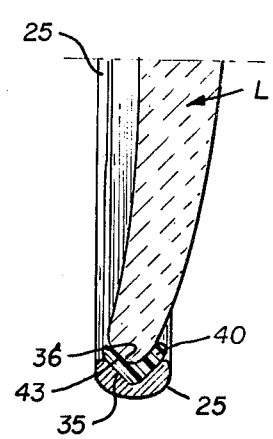
FIG. 5 is a fragmentary, sectional detail similar to FIG. 3, but illustrating the manner in which a lens will fit into the eye wire channel after the eye wire is taken up to close it and embrace the lens in its permanent setting.

Referring more particularly to the drawings, and first to an eyeglass as illustrated in FIGS. 1 and 2, it is to be noted that an eyeglass frame is essentially symmetrical to each side from the vertical center line of the central bridge 20 of the frame. The frame F is illustrated as a metal-plastic combination type in which the plastic material forming the bridge 20 extends across this frame forming the brow section 21 which widens at its end as a flange portion 22. A hinge 23, at the outward edge of the flange portion 22, carries a temple bar 24, a portion only of which is shown in FIG. 1. A lens L is mounted within an eye wire rim 25 which extends completely about the lens L and with its inner and upper parts molded onto the bridge 20, brow 21 and flange 22. This eye wire rim is separable at a break 26, at a point on the flange 22 near the location of the hinge 23. In FIG. 1, the eye wire rim 25 is shown as separated at break 26, to permit the eye wire 25 to receive a lens L. After insertion of the lens, the eye wire 25 is then returned to its closed position by a tube screw 27 having a head 28 and extending through a top tube 29 on one end of the wire rim 25, as well as into an interiorly threaded tube 30. To complete the assembly, a nose pad 32 is affixed to each wire rim, at the left and right sides, by a guard arm 33. The eye wire 25 is provided with a V-shaped channel 35, as shown in FIGS. 3–5, normally to receive a bevel edge 36 of lens L, as shown in FIG. 5. The present invention comes into play whenever the lens fits loosely in the eye wire rim 25 to form a gap, after the eye wire is tightened up.

FIG. 2 illustrates a glasses frame with the right lens L in place with the eye wire tightened on it, while the left lens has not been placed, but the break 26 of the eye wire rim 25 has been opened, or expanded, as by loosening of screw 27. In accordance with this invention, a filler liquid is applied as a continuous bead 40 to and in the V-shaped channel 35 of the eye wire rim 25, as in the manner illustrated in FIGS. 2 and 3. While this liquid may be applied in any suitable manner, a convenient mode of application is to carry the liquid in a collapsible tube 41 having a feed nozzle 42 proportioned to fit into the V-channel 35 of the eye wire rim 25. With this arrangement, the optician can squeeze the tube to form a bead 40 of any desired size or length. This filler liquid bead will rapidly set up, as hereinafter described, and thus, the optician will have a minimum of delay in placing the lens in position. After a short time period, about three minutes, the bead 40 will solidify with a concave channel 43 in the center due to the solidifying bead shrinking slightly and thereby tending to take somewhat the form of the channel, as best shown at FIG. 4. However, the bead, although set as a solid, is sufficiently resilient to yield under pressure of the lens L and thus will be shaped according to the pressure of various portions of the lens. As soon as the bead has set, the optician merely places the lens in position and commences to take up the tube screw. The tube screw will tighten the rim 25 against the lens to push the beveled edge 36 of the lens L into the channel 43 of the bead 40 to automatically seat the lens L upon the filler, as in the manner illustrated in FIG. 5. Pressure of the lens at any position at which the lens is pushed, for instance, further into the channel as shown, will push out any excess resin forming the bead 40.

While the preferred procedure is to permit the liquid bead 40 to set until it is dry to the touch and is, substantially a solid, a glass lens can be successfully set into the eye wire of a frame immediately after the bead is applied. If a plastic lens is to be set, the liquid bead 40 must be dry. If an all-plastic frame is used which is to be heated before inserting the lens, the bead 40 must be permitted to set thoroughly so that all traces of the solvent are evaporated.

A preferred material for the filler liquid was found to be cellulose acetate butyrate manufactured and sold under the trade name Uvex, a product of Eastman Kodak Corporation of Tennessee. This material is available as sheets, powder and pellets and either as virgin or reground material. It is a polymerized product. This material is dissolved in methylene chloride to form a viscous liquid, such as using approximately 5 parts by weight of methylene chloride to 1 part of cellulose acetate butyrate. However, this formulation can vary somewhat, it being desirable to add methylene chloride solvent until a suitable viscosity of the final product is obtained, such as approximating the consistency of natural honey. In dissolving the cellulose acetate butyrate, it was found that the ground form, providing small diameter particles, was necessary and that substantial agitation with the methylene chloride was required before a suitably viscous product was obtained.

Another material found to be suitable for the purpose and having more tenacious adhesive qualities is a cellulose acetate butyrate, a product of Eastman Kodak Corporation of Tennessee, sold under the designation CAB-381-0.5.

The final product, a thick, viscous liquid of cellulose acetate butyrate cut back with methylene chloride solidified in a period of about three minutes since methylene chloride is a highly volatile material. Accordingly, it was important that the solution be stored in a closed container, but if the material in the container were to thicken by loss of solvent, it could be again cut back by the addition of a small amount of methylene chloride. After the methylene chloride evaporated from the solution, the final resin had a good resilience desirable for holding lens in a frame. Also, it was found that this cut back cellulose acetate butyrate would not attack or stick to the acrylic and other resins used in manufacturing high quality glasses frames. The cellulose acetate butyrate will stick to an eye wire with a small degree of tenacity. Should it be desirable for this material to stick more tightly to the eye wire, it is necessary to make sure that the lens eye wire is absolutely clean and free from oils such as might be deposited when the eye wire is touched by an operator's finger. The cellulose acetate butyrate sold as CAB-381-0.5 will stick very tightly to a clean eye wire. The small quantities used as a bead in the eye wire of a frame, and the short time period when the bead 40 was a liquid, were not sufficient to affect the plastic eyeglass frame.

A number of tests were conducted to determine if other materials could perform in the same manner to establish the equivalent materials. It was found that problems would be encountered with volatile solvents of a type which would rapidly attack the plastics used in plastic or plastic-metal combination frames, such as acetone and methyl ethyl ketone; thus, resins which had to be dissolved with such thinners, such as acrylic resins, could not be used for this purpose. cellulose acetate was tried as another material as being possibly suitable for the purpose at hand; however, it was found that this material would shrink too much and tend to be brittle after the solvent evaporated. It was further discovered that certain types of two component urethane materials could be used but involved an undesirable, tedious operation of setting, requiring an exceedingly long time.

The actual proportions of cellulose acetate butyrate to the solvent may be varied somewhat by using approximately 3 parts by weight of methylene chloride to 1 part by weight of cellulose acetate butyrate as one extreme, to approximately 10 parts by weight of methylene chloride to one part of butyrate. Also, it appeared that a selected setting time could be controlled by the proportion of solvent to resin.

The bead 40 used for holding a lens in an eye wire appeared to be quite versatile in its application. It could be advantageously used with various types of lenses. It was especially advantageous for use with thin-edged lenses, such as lenses used after a cataract operation. The resilient bead 40 is applied completely about the periphery of an eye wire to provide a resilient cushion which effectively holds the thin edge of the lenses in place without the danger of the lenses chipping.

We have now described our invention in considerable detail. However, it is evident that others skilled in the art can arrange and devise alternate and equivalent constructions and operations which are nevertheless within the spirit and scope of our invention. Hence, we desire that our protection be limited, not by the constructions and operations illustrated and described, but only by the proper scope of the appended claims.

We claim:

1. A method for installing a lens in a channel of an expansible eye wire rim of a glasses frame, said lens being ground to approximate the shape of said eye wire rim, comprising:
    a. applying to said channel of said eye wire rim a bead of cellulose acetate butyrate cut to a viscous liquid by methylene chloride capable of changing to a resilient, solid state after the expiration of a short time period;
    b. placing said lens in said eye wire rim while the rim is expanded to receive the same; and
    c. closing the eye wire rim upon the lens and resilient resin.

2. The method defined in claim 1, wherein:
    the approximate proportions by weight are 3 to 10 parts of methylene chloride to 1 part of cellulose acetate butyrate.

3. The method defined in claim 1, wherein:
    the approximate proportion of methylene chloride is 5 parts by weight for 1 part of cellulose acetate butyrate.

4. The method of claim 1, wherein:
    the cellulose acetate butyrate is reduced to granular size prior to being dissolved by said methylene chloride.

* * * * *